United States Patent
Campana et al.

(10) Patent No.: US 7,292,596 B1
(45) Date of Patent: Nov. 6, 2007

(54) METHOD AND APPARATUS FOR AUTOMATIC CROSSOVER AND PARALLEL DETECT

(75) Inventors: Francis Campana, Milpitas, CA (US); William Lo, Cupertino, CA (US)

(73) Assignee: Marvell International Ltd, Hamilton (BM)

( * ) Notice: Subject to any disclaimer, the term of this patent is extended or adjusted under 35 U.S.C. 154(b) by 1069 days.

(21) Appl. No.: 10/106,720

(22) Filed: Mar. 26, 2002

(51) Int. Cl.
*H04L 12/56* (2006.01)

(52) U.S. Cl. .................. 370/419; 370/360; 709/220; 710/10

(58) Field of Classification Search ............ 370/419, 370/463, 360; 709/220–222; 710/10
See application file for complete search history.

(56) References Cited

U.S. PATENT DOCUMENTS

| | | | |
|---|---|---|---|
| 5,410,535 A | 4/1995 | Yang et al. | |
| 5,414,708 A | 5/1995 | Webber et al. | |
| 5,577,023 A | 11/1996 | Marum et al. | |
| 5,809,026 A | 9/1998 | Wong et al. | |
| 5,892,926 A | 4/1999 | Witkowski et al. | |
| 5,923,663 A | 7/1999 | Bontemps et al. | |
| 6,175,865 B1 | 1/2001 | Dove et al. | |
| 6,243,756 B1 | 6/2001 | Whitmire et al. | |
| 6,272,552 B1 | 8/2001 | Melvin et al. | |
| 6,661,805 B1 * | 12/2003 | Romano et al. | 370/450 |
| 6,684,347 B1 * | 1/2004 | Coffey | 714/43 |
| 6,833,734 B2 * | 12/2004 | Chan | 326/82 |
| 6,874,041 B1 * | 3/2005 | Burd et al. | 710/38 |
| 2002/0046267 A1 * | 4/2002 | Andra et al. | 709/220 |
| 2005/0036506 A9 * | 2/2005 | Dove | 370/463 |

FOREIGN PATENT DOCUMENTS

| | | |
|---|---|---|
| EP | 00273080 A1 | 7/1988 |
| EP | 00577435 A1 | 7/1993 |
| EP | 00596523 A2 | 5/1994 |
| EP | 00596523 A3 | 1/1996 |
| EP | 00577435 B1 | 2/1999 |
| WO | WO 09413072 A1 | 6/1994 |
| WO | WO 09619877 A1 | 6/1998 |
| WO | WO 00054419 A1 | 9/2000 |

OTHER PUBLICATIONS

IEEE Standard 802.3 (Mar. 8, 2002; 104 pages); IEEE Standard for Information Technology; Telecommunications and Information Exchange Between Systems; Local and Metropolitan Area Networks; Specific Requirements; Part 3: Carrier Sense Multiple Access With Collision Detection (CSMA/CD) Access Method and Physical Layer Specifications.

* cited by examiner

*Primary Examiner*—John Pezzlo (57) ABSTRACT

A physical layer of an Ethernet network device includes first, second, third and fourth terminals. An autonegotiation circuit includes an autonegotiation wait timer having an autonegotiation wait period. An auto-crossover circuit selectively configures the first and second terminals as one of a transmitter and a receiver and the third and fourth terminals as the other of the transmitter and receiver. The auto-crossover circuit includes a sample timer having a sample timer period that has a value that is greater than or equal to the autonegotiation wait period. The auto-crossover circuit includes a random number generator that communicates with the sample timer and generates n random numbers. The sample timer selects one of n sample timer periods based on the generated random number. The n sample timer periods have values that are greater than or equal to the autonegotiation wait period.

65 Claims, 9 Drawing Sheets

METHOD AND APPARATUS FOR AUTOMATIC CROSSOVER AND PARALLEL DETECT

FIELD OF THE INVENTION

The present invention relates to networks, and more particularly to autonegotiation and auto-crossover circuits within a physical layer of devices that are connected by an Ethernet network.

BACKGROUND OF THE INVENTION

Devices operating according to 100BASE-TX or 10BASE-T in an Ethernet network are connected by four pairs of wires. Only two pairs of wires are required. Referring now FIGS. 1 and 2, first and second network devices or network devices 10 and 12 include physical layers (PHYs) 14 and 16 that are connected. For example, the network device 10 can be a personal computer or printer and the network device 12 can be a network switch. Each of the network devices 10 and 12 includes at least two pairs of twisted pair wires that are labeled 1, 2 and 3, 6 in FIGS. 1 and 2.

Figure 1:
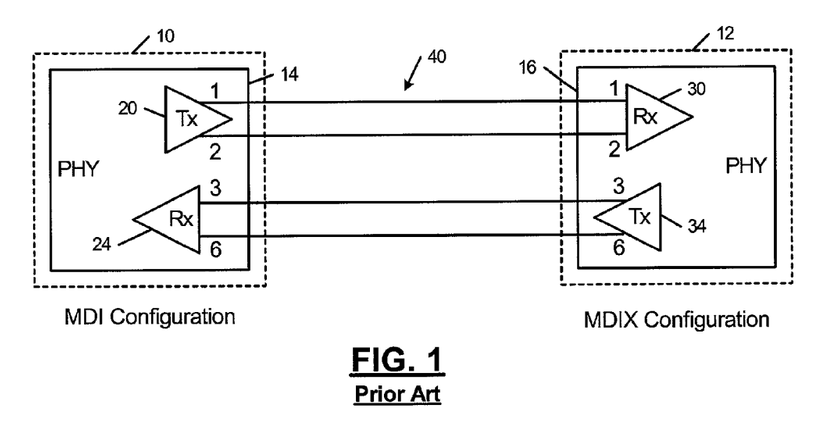
FIG. 1 is a functional block diagram of a first network device in an MDI configuration and a second network device in a MDIX configuration according to the prior art.
Figure 2:
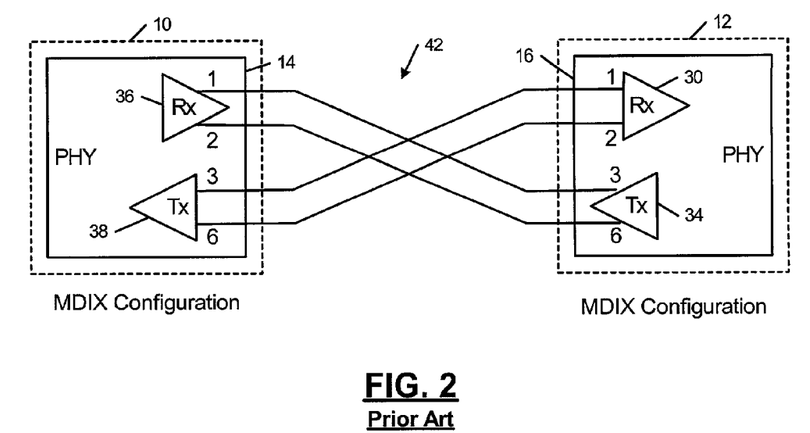
FIG. 2 is a functional block diagram of the first network device in the MDIX configuration and the second network device in the MDIX configuration according to the prior art.

When in an MDI configuration, the PHY 14 has a first pair 1, 2 that is configured as a transmitter 20 and a second pair 3, 6 that is configured as a receiver 24. When in an MDIX configuration, the PHY 16 has a first pair 1, 2 that is configured as a receiver 30 and a second pair 3, 6 that is configured as a transmitter 34. When the network devices 10 and 12 have different configurations, a standard or straight cable 40 is used. When the network devices 10 and 12 have the same configuration, a crossover cable 42 is used.

The use of two different types of cables increases customer equipment inventory and may lead to the inadvertent use of the wrong type of cable. To eliminate the need for two types of cable, some PHYs employ an auto-crossover circuit that automatically switches the PHY between the two configurations. In other words, if the PHY 14 of FIG. 1 is auto-crossover enabled, the PHY 14 is capable of automatically reconfiguring the first pair 1, 2 as a receiver 36 and the second pair 3, 6 as a transmitter 38 as is illustrated in FIG. 2. The auto-crossover function is described more fully in IEEE section 802.3, which is hereby incorporated by reference. In particular, subsections 40.4.4-40.4.6 of IEEE section 802.3 address the auto-crossover capability.

There are different Ethernet networking standards having different data rates. 1000BASE-TX has a maximum data rate of 1 Gb/s. 100BASE-TX has a maximum data rate of 100 Mb/s. 10BASE-T has a maximum data rate of 10 Mb/s. When two network devices communicate, they preferably communicate at the highest common speed. The procedure for negotiating the communication speed and other connection details is called autonegotiation. Further details concerning autonegotiation are also set forth in IEEE section 802.3.

Figure 3:
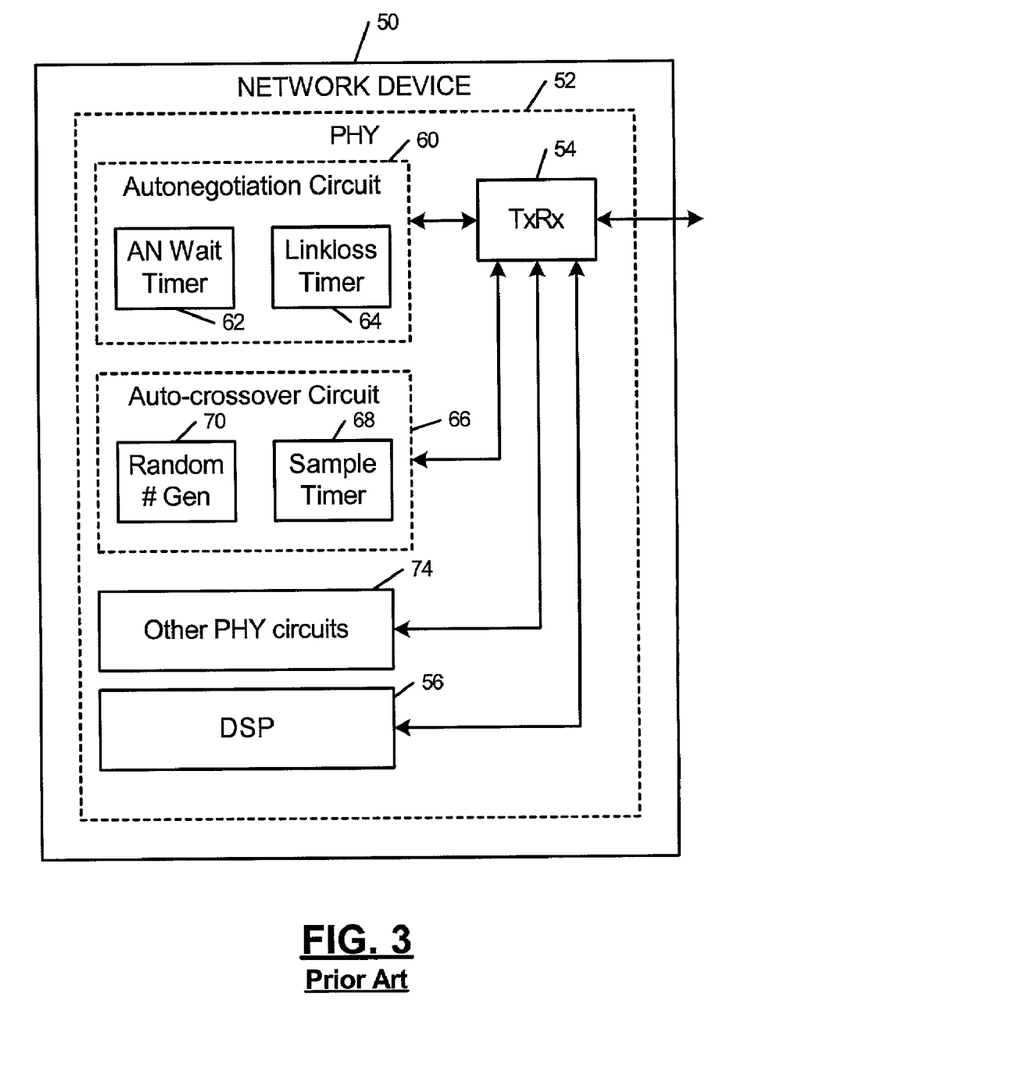
FIG. 3 is a more detailed functional block diagram of a network device according to the prior art.

Referring now to FIG. 3, an exemplary network device 50 is shown. The network device 50 includes a PHY 52 with a transmitter and a receiver that are collectively identified at 54. The PHY 52 is capable of operating at 10 Mb/s, 100 Mb/s and/or 1000 Mb/s. The PHY 52 includes a digital signal processor (DSP) 56. The PHY 52 includes an autonegotiation circuit 60 with an autonegotiation wait timer 62 and a link loss timer 64. The PHY 52 optionally includes an auto-crossover circuit 66 with a sample timer 68 and a random number generator 70. The PHY 52 may include other conventional PHY circuits that are collectively identified at 74. As can be appreciated, the autonegotiation circuit 60 and/or the auto-crossover circuit 66 may be disabled, the PHY 52 may be operated in forced 10 Mb/s or 100 Mb/s modes, and/or the PHY 52 may be a legacy device. One or both of the autonegotiation or auto-crossover circuits may be disabled during debug or troubleshooting to reduce system complexity. Legacy PHY devices are typically autonegotiation enabled but are not auto-crossover enabled.

Figure 4:
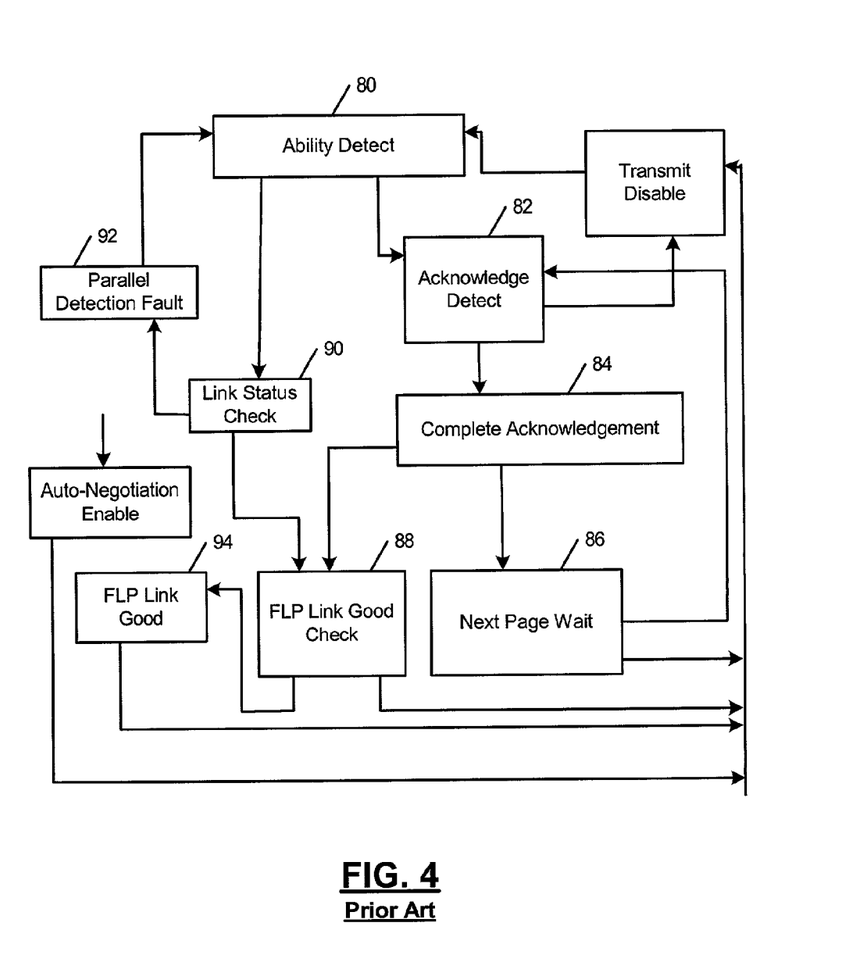
FIG. 4 is a simplified arbitration state diagram according to IEEE section 802.3.

"Parallel detect" describes how autonegotiation is resolved when one network device is autonegotiating while the other network device is in a forced 10 or 100 Mb/s mode. Referring now to FIG. 4, a simplified state diagram corresponding to FIGS. 28-16 of IEEE section 802.3 is shown. A typical state transition for a network device is through blocks 80→82→84→86→82→84→88→94. When a network device is operating in a forced 10 or 100 Mb/s mode or is a legacy device, a problematic state transition that sometimes occurs (and that will be described more fully below) is through blocks 80→90→92→80. Block 90 is associated with an autonegotiation wait timer that typically has a period between 500 ms and 1000 ms. If the link drops out, the autonegotiation state machine transitions from block 90 to block 92 and returns to the initial state in block 80.

In the sections that follow, a legacy parallel detect operation is described for network devices that do not have auto-crossover capabilities. Afterwards, a parallel detect operation is described for a forced 10 or 100 Mb/s network device with auto-crossover capability. In both descriptions, it will be assumed that the autonegotiating device is not auto-crossover capable, which is true for all 10 or 100 Mb/s legacy PHYs.

In a first example involving parallel detect with no auto-crossover capability, a crossover cable is used and both PHYs transmit on pairs 1, 2 and receive on pairs 3, 6. The autonegotiating (AN) PHY starts sending fast link pulses (FLPs). The forced PHY sends normal link pulses (NLPs) in 10 Mb/s mode or scrambled idles in 100 Mb/s mode. When the AN PHY detects either NLPs or scrambled idles, the AN PHY expects the forced network device to continue sending the NLPs or scrambled idles. During an autonegotiation wait timer period, the receiver of the AN PHY detects the NLPs or scrambled idles. If the AN PHY stops detecting the NLPs or scrambled idles for a link loss timer period, the receiver of the AN PHY enters a parallel detect fault state and returns to an initial state. Otherwise when the autonegotiation wait timer period expires, the autonegotiation state machine enables the 10 Mb/s physical medium attachment (PMA) if the received signals were NLPs or the 100 Mb/s PMA if the received signals were 100 Mb/s scrambled idles.

In this example, important timers are the autonegotiation wait timer and a link loss timer (that typically has a period of 50-100 ms). During the autonegotiation wait timer period (e.g., 1000 ms) after detecting the original NLPs, if no NLPs are received for the link loss timer period (e.g. 50 ms), then the link is considered lost and the AN PHY enters the parallel detect fault state.

In a second example involving parallel detect with auto-crossover, a crossover cable is used and the network devices are powered up. Both PHYs transmit on pairs 1, 2 and receive on pairs 3, 6. The AN PHY starts sending FLPs and the forced PHY sends NLPs in 10 Mb/s mode or scrambled idles in 100 Mb/s mode. When the AN PHY detects either NLP or scrambled idles, the AN PHY starts the autonegotiation wait timer and stops sending FLPs. During the timer period, the parallel detect state machine of the AN PHY expects the forced network device to continue sending the NLPs or scrambled idles. Since the AN PHY stopped sending FLPs, the forced network device does not detect a network device. Since the forced network device has auto-crossover capability, the forced network device will reconfigure and begin transmitting on pairs 3, 6 and receiving on pair 1, 2.

The auto-crossover happens after waiting for a sample timer period, which is typically 62 ms+/−2 ms. When the forced network device stops sending on pair 1, 2, the AN PHY will stop receiving on pair 3, 6. The AN PHY expects to receive signals on pair 3, 6 for at least a period equal to the autonegotiation wait period. Therefore, the AN PHY will enter the parallel detect fault state and return to an initial state.

While the forced network device is transmitting on the pair 3, 6, the AN PHY does not receive a signal on the pair 3, 6. If the AN PHY is not auto-crossover enabled, the AN PHY expects to receive signals on the pair 3, 6. Since the PHY of the forced network device is listening on the pair 1, 2 and the AN PHY is sending FLPs on the pair 1, 2, the forced network device will not receive anything either (remember the crossover cable). The PHY of the forced network device eventually switches to MDI operation (the original state) and begins transmitting on pair 1, 2 and receiving on pair 3, 6. Operation repeats as described above and the link is never established. In the second situation, important timers are the autonegotiation wait timer, the link loss timer, and the sample timer.

Figure 5:
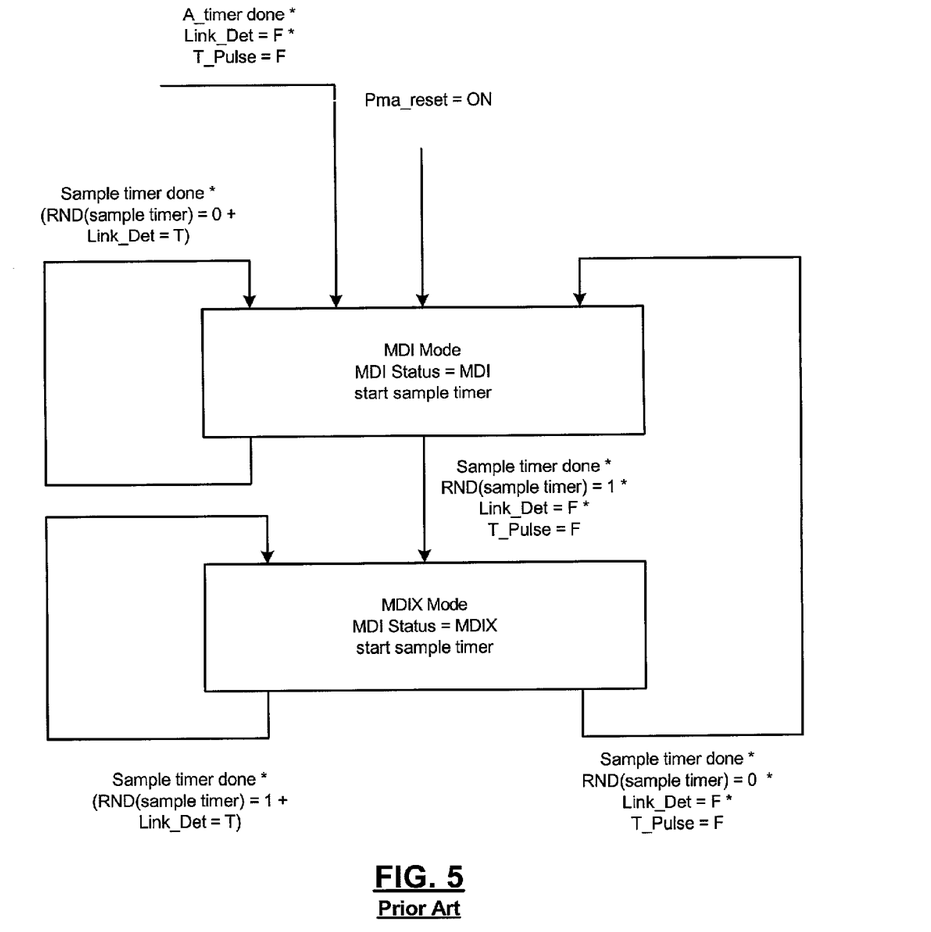
FIG. 5 is an auto-crossover state diagram according to IEEE section 802.3.

Customers expect to have the auto-crossover capability even iwhen operating in forced 10 or 100 Mb/s modes of operation. As can be appreciated, the discussion set forth above has been simplified for clarity. Auto-crossover circuits generate random numbers when deciding whether to switch between MDI or MDIX modes as is described further in IEEE section 802.3. Referring now to FIG. 5, an auto-crossover state diagram (FIGS. 40-17 of IEEE section 802.3) is shown that illustrates the random number function. It is possible that a switch may take up to 11 sample timers, which may or may not allow a link before the autonegotiation wait timer expires. Note that the sample timer is associated with the auto-crossover circuit.

In summary, conventional auto-crossover circuits are designed to run with autonegotiation enabled. As currently defined, the auto-crossover sample timer is incompatible with the autonegotiation wait timer. Therefore, auto-crossover may not work between two PHYs when a first PHY is forced to 100Base-TX and a second PHY is autonegotiation enabled or when a first PHY is forced to 10Base-T and a second PHY is autonegotiation enabled.

SUMMARY OF THE INVENTION

A physical layer of a network device in an Ethernet network includes a first output and a second output. An autonegotiation circuit includes an autonegotiation wait timer having an autonegotiation wait period. An auto-crossover circuit selectively configures the first output as one of a transmitter and a receiver and the second output as the other of the transmitter and receiver. The auto-crossover circuit includes a sample timer having a sample timer period that has a value that is greater than or equal to the autonegotiation wait period.

In other features, the auto-crossover circuit further includes a random number generator. The random number generator communicates with the sample timer and generates n random numbers. The sample timer selects one of n sample timer periods based on a current random number that is generated by the random number generator. The n sample timer periods have values that are greater than or equal to the autonegotiation wait period.

In still other features, the auto-crossover circuit changes a configuration of the first output and the second output when the sample timer period is done and both no activity and no link states are true. After the auto-crossover circuit changes the configuration, the sample timer resets the sample timer period based on a current random number that is generated by the random number generator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

When a first PHY is autonegotiation enabled and a second PHY is operating in a forced 100BASE-TX or 10BASE-T mode, a modified auto-crossover circuit according to the present invention is employed in the second PHY. The modified auto-crossover circuit of the second PHY increases a period of the sample timer. The period of the sample timer of the auto-crossover of the second PHY is set to a value that is greater than or equal to the period of an autonegotiation wait timer. This allows the autonegotiation circuit of the first PHY a sufficient amount of time to establish a link.

When one PHY is auto-crossover enabled and the other PHY is not, the conventional auto-crossover circuit requires an average of approximately 2 sample timer periods before a configuration switch occurs. In a worst case scenario, the conventional auto-crossover circuit requires 11 sample timer periods to switch the configuration due to the use of a random number generator. Because the sample timer must be greater than the worst-case autonegotiation wait period, the switch between MDI and MDIX configurations can take up to 11 seconds to occur.

A state diagram of the conventional auto-crossover circuit can be modified such that a swap occurs every sample timer period. If implemented, the average and worst case times are equal to one sample timer period. However, a problem arises when both PHYs have the autonegotiation circuit disabled and the auto-crossover circuit enabled. A potential deadlock situation occurs when both PHYs are in lock step and are switching configurations at the same time.

To resolve the deadlock, the present invention randomly changes the period of the sample timer of the auto-crossover circuit every time a configuration switch occurs. For example, a random number generator generates n values. The sample timer has a timer period corresponding to each of the n values. For example if n=2, the random number generator generates 2 values corresponding to two sample timer periods, such as 1.17 and 1.34 seconds. The n sample timing periods are greater than the autonegotiation period. Since the sample timer period is randomly determined at both PHYs, the lockstep deadlock is avoided.

Figure 6:
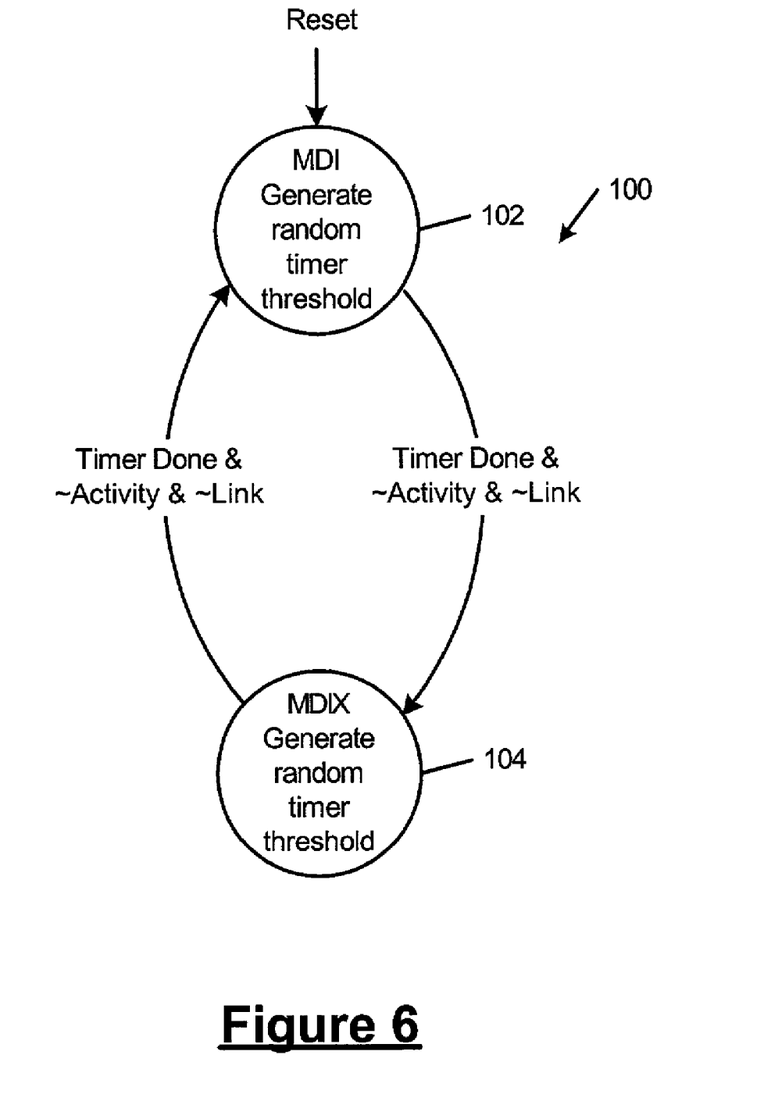
FIG. 6 is a state diagram of a modified auto-crossover circuit according to the present invention.

Referring now to FIG. 6, a state diagram 100 for an exemplary modified auto-crossover circuit according to the present invention is shown. When reset, the auto-crossover circuit is initialized in the MDI state and a random timer is started at 102. As can be appreciated, the initial state can be either the MDI or the MDIX state. If the random timer is done and the no activity and no link states are true, the auto-crossover circuit switches to the MDIX state at 104 and resets the random timer. If the random timer is done and the no activity and no link states are true, the auto-crossover circuit transitions to the MDI state at 102 and resets the random timer. The period of the random timer is randomly determined when each configuration switch occurs.

Figure 7:
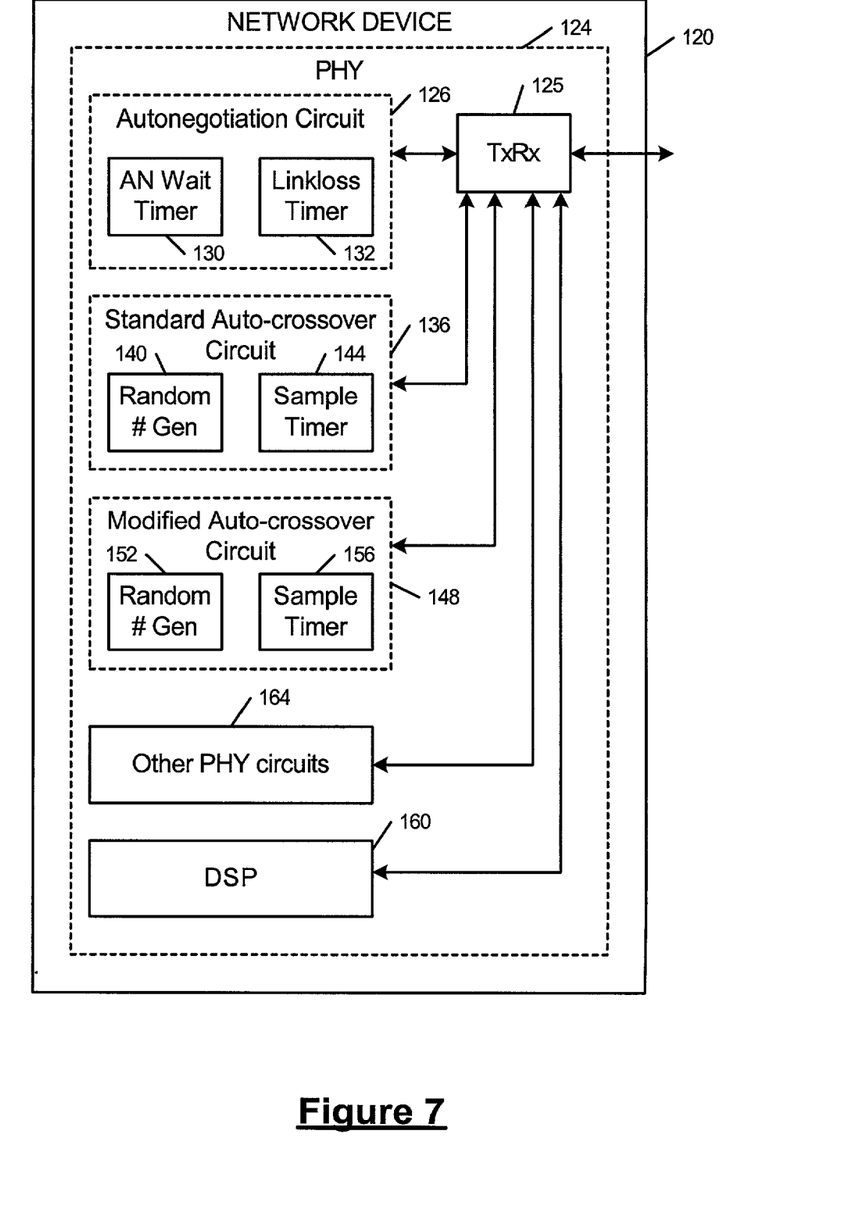
FIG. 7 is a functional block diagram of a first exemplary modified auto-crossover circuit of a network device according to the present invention.

Referring now to FIG. 7, a network device 120 includes a PHY 124 with a transmitter and a receiver that are collectively identified at 125. The PHY 124 further includes an autonegotiation circuit 126 with a wait timer 130 and a link loss timer 132. A standard auto-crossover circuit 136 optionally operates in accordance with IEEE section 802.3 when neither PHY is in a forced 10 or 100 Mb/s mode. The auto-crossover circuit 136 includes a sample timer 140 and a random number generator 144.

When one PHY operates in the forced 10 or 100 Mb/s mode and another PHY autonegotiates, a modified auto-crossover circuit 148 controls switching between the two configurations. The modified auto-crossover circuit 148 includes a random number generator 152 and a sample timer 156. As can be appreciated, the random number generator 152 and the sample timer 156 may be integrated into a random timer. The random number generator 152 generates n random numbers where n>1. The sample timer 156 has n different sample periods corresponding to the n random numbers. The n sample timer periods have values that are greater than the autonegotiation wait timer. The PHY 124 further includes a DSP 160 and other PHY circuits 164. The random number generator 152 is used to generate the n random numbers that are used to select the n sample timer periods. Note that the approach using the randomly generated sample timer periods can be used for all operating states instead of only when one PHY is forced and the other PHY is autonegotiating.

Figure 8:
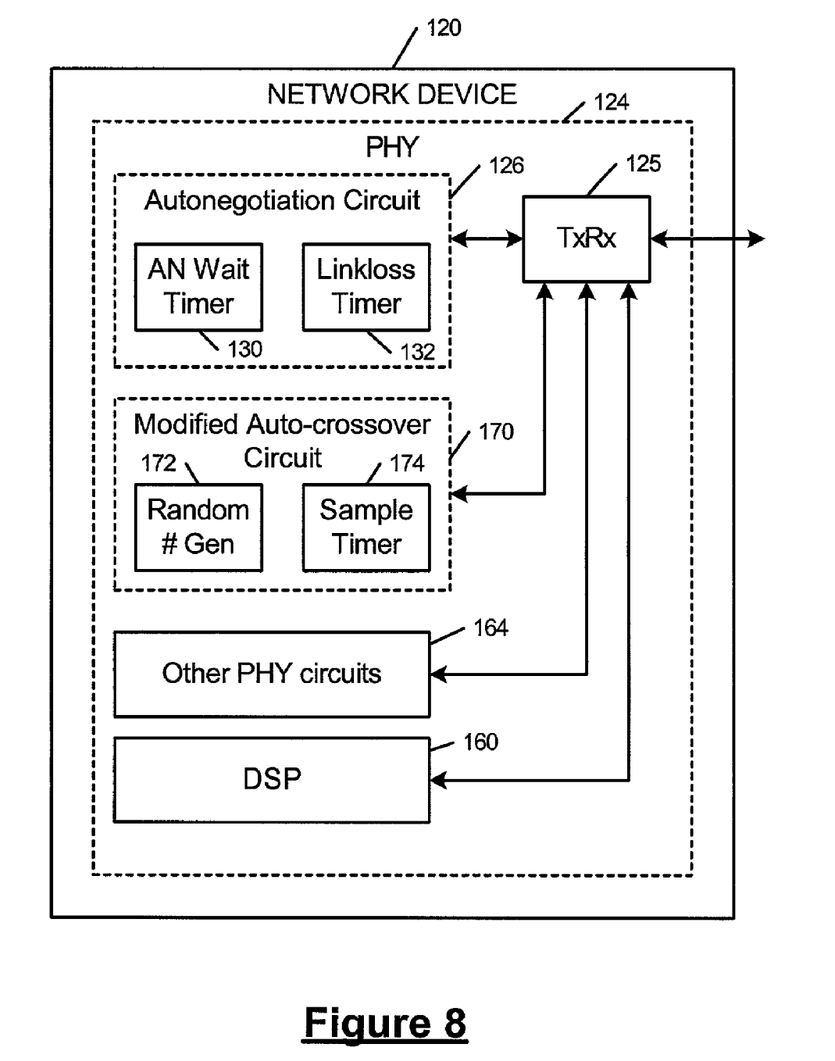
FIG. 8 is a functional block diagram of a second exemplary modified auto-crossover circuit of a network device according to the present invention.

Referring now to FIG. 8, reference numerals from FIG. 7 have been used in FIG. 8 to identify similar elements. The standard and modified auto-crossover circuits 136 and 148 have been combined into a modified auto-crossover circuit 170. Alternately, the modified auto-crossover circuit 170 can operate in a manner similar to the modified auto-crossover circuit 148 for all states. Otherwise, the operation of the network devices in FIGS. 7 and 8 are similar.

Figure 9:
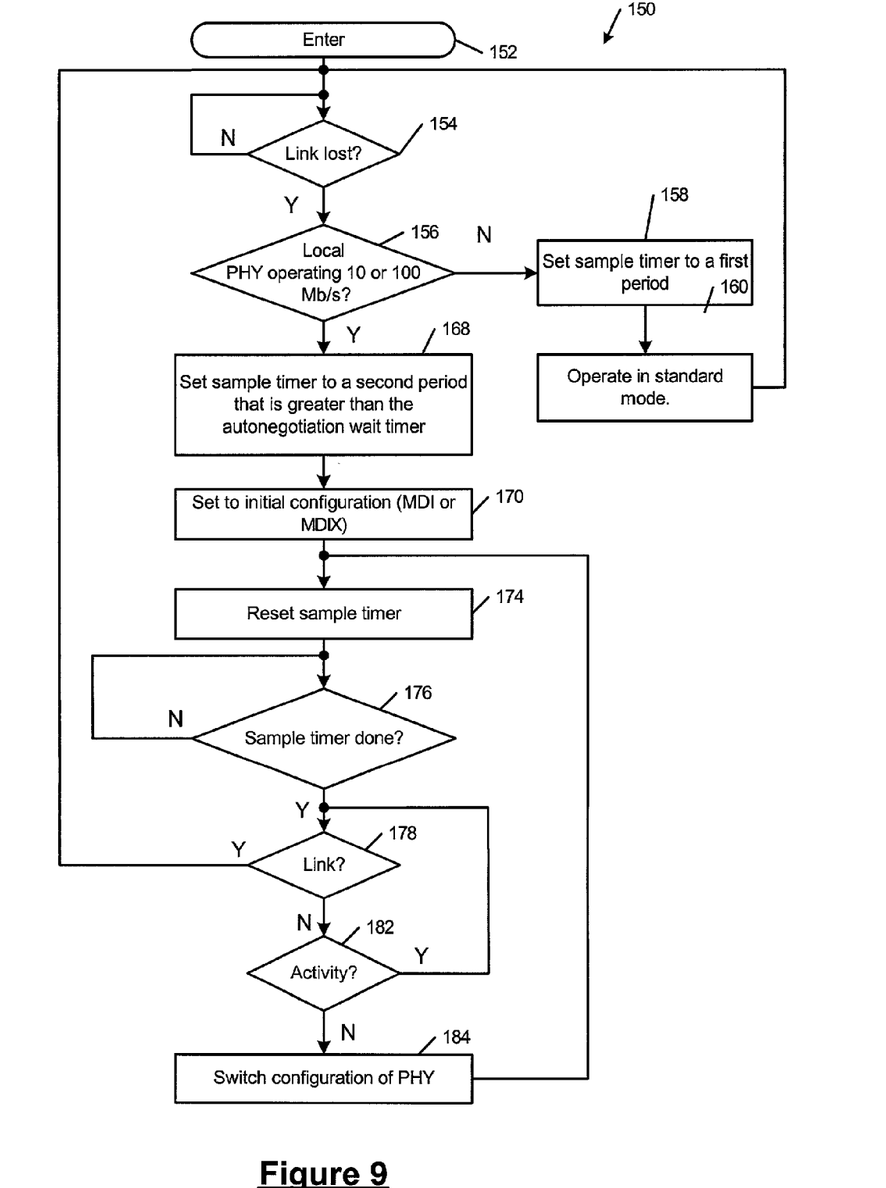
FIG. 9 is a flowchart illustrating steps of a first exemplary method performed by the modified auto-crossover circuit.

Referring now to FIG. 9, the modified steps for operating the auto-crossover circuit according to the present intention is shown generally at 150. Control enters at step 152. In step 154, control determines whether a link is lost. If true, control continues with step 156. Otherwise control loops back to step 154. In step 156, the auto-crossover circuit determines whether the local PHY is operating in the forced 10 or 100 Mb/s mode. If not, the sample timer is set to a standard period set forth in IEEE section 802.3 (62 ms+/−2 ms) in step 158. In step 160, the auto-crossover circuit operates in a standard mode. Control loops back to step 154.

If the local PHY is operating in the forced 10 or 100 Mb/s mode, control continues with step 168. In step 168, the sample timer is set to a second period that is greater than the autonegotiation wait timer. In step 170, the initial configuration is set equal to either MDI or MDIX. In step 174, the sample timer is reset. In step 176, control determines whether the sample timer is done. If not, control loops back to step 176. Otherwise, control determines whether the link states is true in step 176. If true, control continues with step 154. Otherwise control continues with step 182. In step 182, control determines whether activity is present. If true, control loops to step 178. Otherwise control continues with step 184 and switches the configuration of the PHY. Control loops back to step 174.

Figure 10:
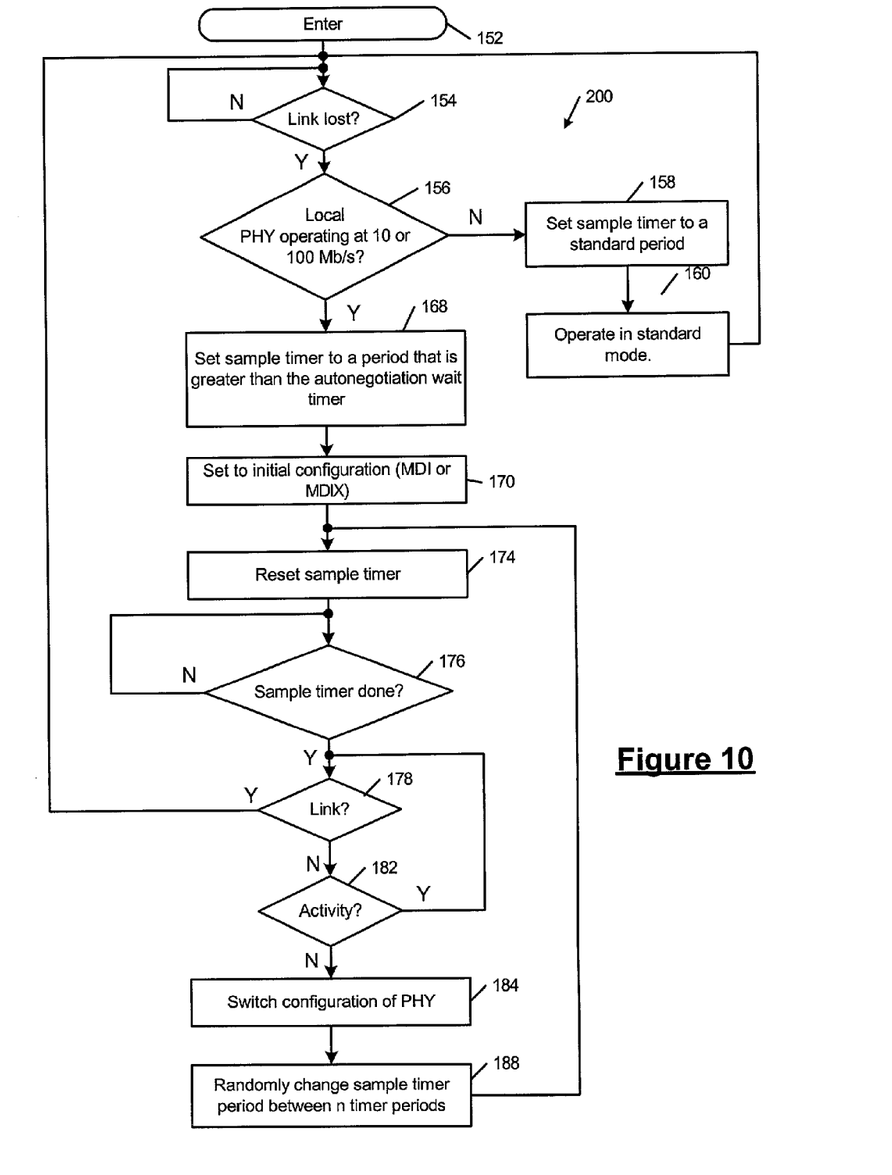
FIG. 10 is a flowchart illustrating steps of a second exemplary method performed by the modified auto-crossover circuit.

Referring now to FIG. 10, an alternate method for operating the auto-crossover circuit according to the present invention is shown generally at 200. For purposes of clarity, reference numerals from FIG. 9 are used in FIG. 10 to identify similar steps. After step 184, the sample timer period is randomly changed between the n timer period values based on the random number that is generated in step 188. Control loops back to step 174.

As can be appreciated, the PHY may be implemented in a variety of different ways including but not limited to software excarted by a processor and memory, an application specific integrated circuit, a system on chip (SOC) including logic and embedded memory, or in any other suitable manner.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A physical layer of a network device in an Ethernet network, comprising:
   a first output;
   a second output;
   an autonegotiation circuit including an autonegotiation wait timer having an autonegotiation wait period; and
   an auto-crossover circuit that selectively configures said first output as one of a transmitter and a receiver and said second output as the other of said transmitter and receiver, wherein said auto-crossover circuit includes a sample timer having a sample timer period that is greater than or equal to said autonegotiation wait period.

2. The physical layer of claim 1 wherein said first output includes first and second terminals and said second output includes third and fourth terminals.

3. The physical layer of claim 1 wherein said auto-crossover circuit further includes a random number generator.

4. The physical layer of claim 3 wherein said random number generator communicates with said sample timer and generates n random numbers.

5. The physical layer of claim 4 wherein said sample timer selects one of n sample timer periods based on a random number that is generated by said random number generator.

6. The physical layer of claim 5 wherein said n sample timer periods are greater than or equal to said autonegotiation wait period.

7. The physical layer of claim 1 wherein said auto-crossover circuit changes a configuration of said first output and said second output when said sample timer period is done and no activity and no link states are true.

8. The physical layer of claim 5 wherein said auto-crossover circuit changes a configuration of said first output and said second output when said one of said n sample timer periods is done and no activity and no link states are true.

9. The physical layer of claim 8 wherein after said auto-crossover circuit changes said configuration, said sample timer resets said sample timer period based on a random number that is generated by said random number generator.

10. The physical layer of claim 1 wherein said auto-crossover circuit increases said sample timer period when said physical layer is operating in one of a forced 10 Mb/s operating mode and a 100 Mb/s operating mode.

11. The physical layer of claim 1 wherein said physical layer is implemented by software that is executed by a processor and memory.

12. An Ethernet network, comprising:
a first network device including a first physical layer with a first output and a second output, an autonegotiation circuit including an autonegotiation wait timer having an autonegotiation wait period; and
a second network device including a second physical layer with a first output and a second output, and an auto-crossover circuit that selectively configures said first output of said second network device as one of a transmitter and a receiver and said second output of said second network device as the other of said transmitter and receiver, wherein said second network device operates at one of a first data rate and a second data rate, and wherein said auto-crossover circuit includes a sample timer having a sample timer period that is greater than or equal to said autonegotiation wait period.

13. The Ethernet network of claim 12 wherein said first output of said second physical layer includes first and second terminals and said second output includes third and fourth terminals.

14. The Ethernet network of claim 12 wherein said first data rate is 10 Mb/s and said second data rate is 100 Mb/s.

15. The Ethernet network of claim 12 further comprising a cable connecting said first and second network devices.

16. The Ethernet network of claim 12 wherein said auto-crossover circuit further includes a random number generator.

17. The Ethernet network of claim 16 wherein said random number generator communicates with said sample timer and generates n random numbers.

18. The Ethernet network of claim 17 wherein said sample timer selects one of n sample timer periods based on a random number that is generated by said random number generator.

19. The Ethernet network of claim 18 wherein said n sample timer periods have values that are greater than or equal to said autonegotiation wait period.

20. The Ethernet network of claim 12 wherein said auto-crossover circuit changes a configuration of said first output and said second output of said second network device when said sample timer period is done and no activity and no link states are true.

21. The Ethernet network of claim 17 wherein said auto-crossover circuit changes a configuration of said first output and said second output of said second network device when one of said n sample timer periods is done and no activity and no link states are true.

22. The Ethernet network of claim 21 wherein after said auto-crossover circuit changes said configuration, said sample timer resets said sample timer period based on a random number that is generated by said random number generator.

23. The Ethernet network of claim 12 wherein said second physical layer is implemented by software that is executed by a processor and memory.

24. A physical layer of a network device in an Ethernet network, comprising:
a first output;
a second output;
autonegotiation means for autonegotiating a link and including an autonegotiation timing means for timing an autonegotiation wait period; and
auto-crossover means for selectively configuring said first output as one of a transmitter and a receiver and said second output as the other of said transmitter and receiver, wherein said auto-crossover means includes a sample timing means for timing a sample timer period that is greater than or equal to said autonegotiation wait period.

25. The physical layer of claim 24 wherein said first output includes first and second terminals and said second output includes third and fourth terminals.

26. The physical layer of claim 24 wherein said auto-crossover circuit means further includes a generating means for generating a random number.

27. The physical layer of claim 26 wherein said generating means communicates with said sample timing means and generates n random numbers.

28. The physical layer of claim 27 wherein said sample timing means selects one of n sample timer periods based on a random number that is generated by said generating means.

29. The physical layer of claim 28 wherein said n sample timer periods have values that are greater than or equal to said autonegotiation wait period.

30. The physical layer of claim 24 wherein said auto-crossover means changes a configuration of said first output and said second output when said sample timer period is done and no activity and no link states are true.

31. The physical layer of claim 28 wherein said auto-crossover means changes a configuration of said first output and said second output when said one of said n sample timer periods is done and no activity and no link states are true.

32. The physical layer of claim 31 wherein after said auto-crossover means changes said configuration, said sample timing means resets said sample timer period based on a random number that is generated by said generating means.

33. The physical layer of claim 24 wherein said auto-crossover means increases said sample timer period when said physical layer is operating in one of a forced 10 Mb/s operating mode and a 100 Mb/s operating mode.

34. The physical layer of claim 24 wherein said physical layer is implemented by software that is executed by a processor and memory.

35. An Ethernet network, comprising:
a first network device including a first physical layer with a first output and a second output, autonegotiation means for autonegotiating a link and including autonegotiation timing means for timing an autonegotiation wait period; and
a second network device including a second physical layer with a first output and a second output, and auto-crossover means for selectively configuring said first output of said second network device as one of a transmitter and a receiver and said second output of said second network device as the other of said transmitter and receiver, wherein said second network device operates at one of a first data rate and a second data rate, and wherein said auto-crossover means includes sample timing means for timing a sample timer period that is greater than or equal to said autonegotiation wait period.

36. The Ethernet network of claim 35 wherein said first output of said second physical layer includes first and second terminals and said second output includes third and fourth terminals.

37. The Ethernet network of claim 35 wherein said first data rate is 10 Mb/s and said second data rate is 100 Mb/s.

38. The Ethernet network of claim 35 further comprising a cable connecting said first and second network devices.

39. The Ethernet network of claim 35 wherein said auto-crossover means further includes generating means for generating a random number.

40. The Ethernet network of claim 39 wherein said generating means communicates with said sample timing means and generates n random numbers.

41. The Ethernet network of claim 40 wherein said sample timing means selects one of n sample timer periods based on a random number that is generated by said generating means.

42. The Ethernet network of claim 41 wherein said n sample timer periods have values that are greater than or equal to said autonegotiation wait period.

43. The Ethernet network of claim 35 wherein said auto-crossover means changes a configuration of said first output and said second output of said second network device when said sample timer period is done and no activity and no link states are true.

44. The Ethernet network of claim 40 wherein said auto-crossover means changes a configuration of said first output and said second output of said second network device when one of said n sample timer periods is done and no activity and no link states are true.

45. The Ethernet network of claim 44 wherein after said auto-crossover means changes said configuration, said sample timing means resets said sample timer period based on a random number that is generated by said generating means.

46. The Ethernet network of claim 35 wherein said second physical layer is implemented by software that is executed by a processor and memory.

47. A method for operating a physical layer of an Ethernet network device, wherein said physical layer includes first and second outputs, an autonegotiation circuit including an autonegotiation wait timer having an autonegotiation wait period, and an auto-crossover circuit that selectively configuring said first output as one of a transmitter and a receiver and said second output as the other of said transmitter and receiver, comprising:
setting a sample timer period of said auto-crossover circuit to a value that is greater than or equal to said autonegotiation wait period.

48. The method of claim 47 wherein said first output includes first and second terminals and said second output includes third and fourth terminals.

49. The method of claim 47 further comprising:
generating one of n random numbers using a random number generator; and
selecting one of n sample timer periods based on said random number that is generated by said random number generator.

50. The method of claim 49 wherein said n sample timer periods have values that are greater than or equal to said autonegotiation wait period.

51. The method of claim 50 further comprising changing a configuration of said first output and said second output when said one of said n sample timer periods is done and no activity and no link states are true.

52. The method of claim 51 further comprising resetting said sample timer period based on a random number that is generated by said random number generator after said auto-crossover circuit changes said configuration.

53. The method of claim 47 wherein said step of setting said sample timer period is performed when said physical layer is operating in one of a forced 10 Mb/s operating mode and a 100 Mb/s operating mode.

54. The method of claim 47 further comprising implementing said physical layer in software that is executed by a processor and memory.

55. A method of operating an Ethernet network, comprising:
providing a first network device including a first physical layer with a first output and a second output, an autonegotiation circuit including an autonegotiation wait timer having an autonegotiation wait period; and
providing a second network device including a second physical layer with a first output and a second output, and an auto-crossover circuit;
selectively configuring said first output of said second network device as one of a transmitter and a receiver and said second output of said second network device as the other of said transmitter and receiver using said auto-crossover circuit;
operating said second network device at one of a first data rate and a second data rate; and
setting a sample timer period of said auto-crossover circuit to a value that is greater than or equal to said autonegotiation wait period.

56. The method of claim 55 wherein said first output of said second physical layer includes first and second terminals and said second output includes third and fourth terminals.

57. The method of claim 55 wherein said first data rate is 10 Mb/s and said second data rate is 100 Mb/s.

58. The method of claim 55 further comprising connecting said first and second network devices using a cable.

59. The method of claim 55 further comprising generating one of n random numbers.

60. The method of claim 59 further comprising selecting one of n sample timer periods based on said random number that is generated by said random number generator.

61. The method of claim 60 wherein said n sample timer periods have values that are greater than or equal to said autonegotiation wait period.

62. The method of claim 61 further comprising changing a configuration of said first output and said second output of said second network device when said sample timer period is done and no activity and no link states are true.

63. The method of claim 59 further comprising resetting said sample timer period based on one of said n random numbers after said auto-crossover circuit changes said configuration.

64. The method of claim 55 wherein said second physical layer is implemented by software that is executed by a processor and memory.

65. A physical layer of a network device in an Ethernet network, comprising:

a first output;

a second output;

an autonegotiation circuit including an autonegotiation wait timer having an autonegotiation wait period;

a first auto-crossover circuit that selectively configures said first output as one of a transmitter and a receiver and said second output as the other of said transmitter and receiver, wherein said first auto-crossover circuit includes a sample timer having a sample timer period that is less than said autonegotiation wait period;

a modified auto-crossover circuit that selectively configures said first output as one of a transmitter and a receiver and said second output as the other of said transmitter and receiver, wherein said modified auto-crossover circuit includes a sample timer having a sample timer period that is greater than or equal to said autonegotiation wait period.

* * * * *

UNITED STATES PATENT AND TRADEMARK OFFICE
CERTIFICATE OF CORRECTION

| | | |
|---|---|---|
| PATENT NO. | : 7,292,596 B1 | Page 1 of 1 |
| APPLICATION NO. | : 10/106720 | |
| DATED | : November 6, 2007 | |
| INVENTOR(S) | : Francis Campana et al. | |

It is certified that error appears in the above-identified patent and that said Letters Patent is hereby corrected as shown below:

Column 1, Line 17    Insert -- to -- after "now"
Column 3, Line 29    Delete "iwhen" and insert -- when --
Column 6, Line 13    Delete "intention" and insert -- invention --
Column 8, Line 50    Delete "circuit" after "crossover"

Signed and Sealed this

Twenty-ninth Day of April, 2008

JON W. DUDAS
*Director of the United States Patent and Trademark Office*